United States Patent
Yuan et al.

(10) Patent No.: US 11,599,813 B1
(45) Date of Patent: Mar. 7, 2023

(54) INTERACTIVE WORKFLOW GENERATION FOR MACHINE LEARNING LIFECYCLE MANAGEMENT

(71) Applicant: Amazon Technologies, Inc., Seattle, WA (US)

(72) Inventors: Fei Yuan, Redmond, WA (US); Shuye Huang, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 735 days.

(21) Appl. No.: 16/584,852

(22) Filed: Sep. 26, 2019

(51) Int. Cl.
*G06N 5/04* (2006.01)
*G06F 9/50* (2006.01)
*G06N 5/045* (2023.01)

(52) U.S. Cl.
CPC ........... *G06N 5/045* (2013.01); *G06F 9/5005* (2013.01)

(58) Field of Classification Search
USPC .......................................................... 706/11
See application file for complete search history.

(56) References Cited

U.S. PATENT DOCUMENTS

| | | | |
|---|---|---|---|
| 8,892,947 B1 | 11/2014 | Chopra et al. | |
| 9,053,210 B2 | 6/2015 | Elnikety et al. | |
| 9,529,630 B1 | 12/2016 | Fakhouri et al. | |
| 9,665,463 B2 | 5/2017 | Anderson et al. | |
| 11,182,695 B1* | 11/2021 | Kirsche | G06N 3/088 |
| 2015/0379429 A1* | 12/2015 | Lee | G09B 5/00 706/11 |
| 2020/0327196 A1* | 10/2020 | Sampat | G06N 20/00 |
| 2020/0410288 A1* | 12/2020 | Capota | G06V 30/194 |
| 2021/0011757 A1* | 1/2021 | Duesterwald | G06N 20/00 |
| 2022/0091837 A1* | 3/2022 | Chai | G06F 8/36 |

OTHER PUBLICATIONS

Nishant Thacker; "Automated Machine Learning and MLOps with Azure Machine Learning"; Microsoft Azure website (azure.microsoft.com) [full URL in ref.]; Oct. 28, 2019 (Year: 2019).*

(Continued)

*Primary Examiner* — Wei Y Zhen
*Assistant Examiner* — Clint Thatcher
(74) *Attorney, Agent, or Firm* — Robert C. Kowert; Kowert, Hood, Munyon, Rankin & Goetzel, P.C.

(57) ABSTRACT

Methods, systems, and computer-readable media for interactive workflow generation for machine learning lifecycle management are disclosed. A machine learning management system determines one or more prompts associated with use of a machine learning model. Input representing one or more responses to the one or more prompts is received. The one or more responses are provided via a user interface. The machine learning management system determines one or more workflows associated with the machine learning model. The workflow(s) are determined based at least in part on the one or more responses. The workflow(s) comprise a plurality of tasks associated with use of the machine learning model at a plurality of stages of a lifecycle of the model. One or more computing resources are determined, and at least a portion of the workflow(s) is performed using the one or more computing resources.

20 Claims, 7 Drawing Sheets

(56) References Cited

OTHER PUBLICATIONS

Unknown, "What is automated machine learning?", Retrieved from https://docs.microsoft.com/en-us/azure/machine-learning/service/concept-automated-ml, Jun. 19, 2019, 7 Pages.
Frederic Lardinois, "Microsoft launces a drag-and-drop machine learning tool", Retrieved from https://techcrunch.com/2019/05/02/microsoft-launches-a-drag-and-drop-machine-learning-tool-and-hosted-jupyter-notebooks/, May 2019, 11 pages.
Unknown, "Create, explore and deploy automated machine learning experiments with Azure Machine Learning's workspace landing page (preview)", Retrieved from https://docs.microsoft.com/en-us/azure/machine-learning/service/how-to-create-portal-experiments, Sep. 8, 2019, 11 Pages.
U.S. Appl. No. 16/005,372, filed Jun. 11, 2018, Donald Erik Schneider.
Google Cloud Platform, "Deploying a Pipeline," Google, Jul. 2017, Retrieved from: https://cloud.google.com/dataflow/service/dataflow-service-desc, pp. 1-11.
Beisken, S. et al. "KNIME-CDK: Workflow-driven Cheminformatics." BMC Bioinformatics. 14:257, Aug. 2013, 4 Pages 801-804.
Warr, Wendy, "Scientific workflow systems: Pipeline Pilot and KNIME," Journal of Computer-Aided Molecular Design, vol. 26, pp. 801-804, May 2012, pp. 801-804.
"Red Hat JBoss Enterprise Application Platform 7.1: Introduction to JBoss EAP," redhat.com, Apr. 2018, 12 Pages.

\* cited by examiner

INTERACTIVE WORKFLOW GENERATION FOR MACHINE LEARNING LIFECYCLE MANAGEMENT

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

A distributed system may provide remote clients with access to various services that are implemented largely within the distributed system and that are accessible via a network such as the Internet. Examples of such systems include online merchants, internet service providers, corporate networks, cloud computing services, web-based hosting services, and so on. Some distributed systems may use machine learning models that are trained, tested, and then used to predict future behaviors. In prior approaches, ad-hoc use of machine learning models by developers and machine learning scientists was often disorganized and consumed time and resources unnecessarily.

Figure 1:
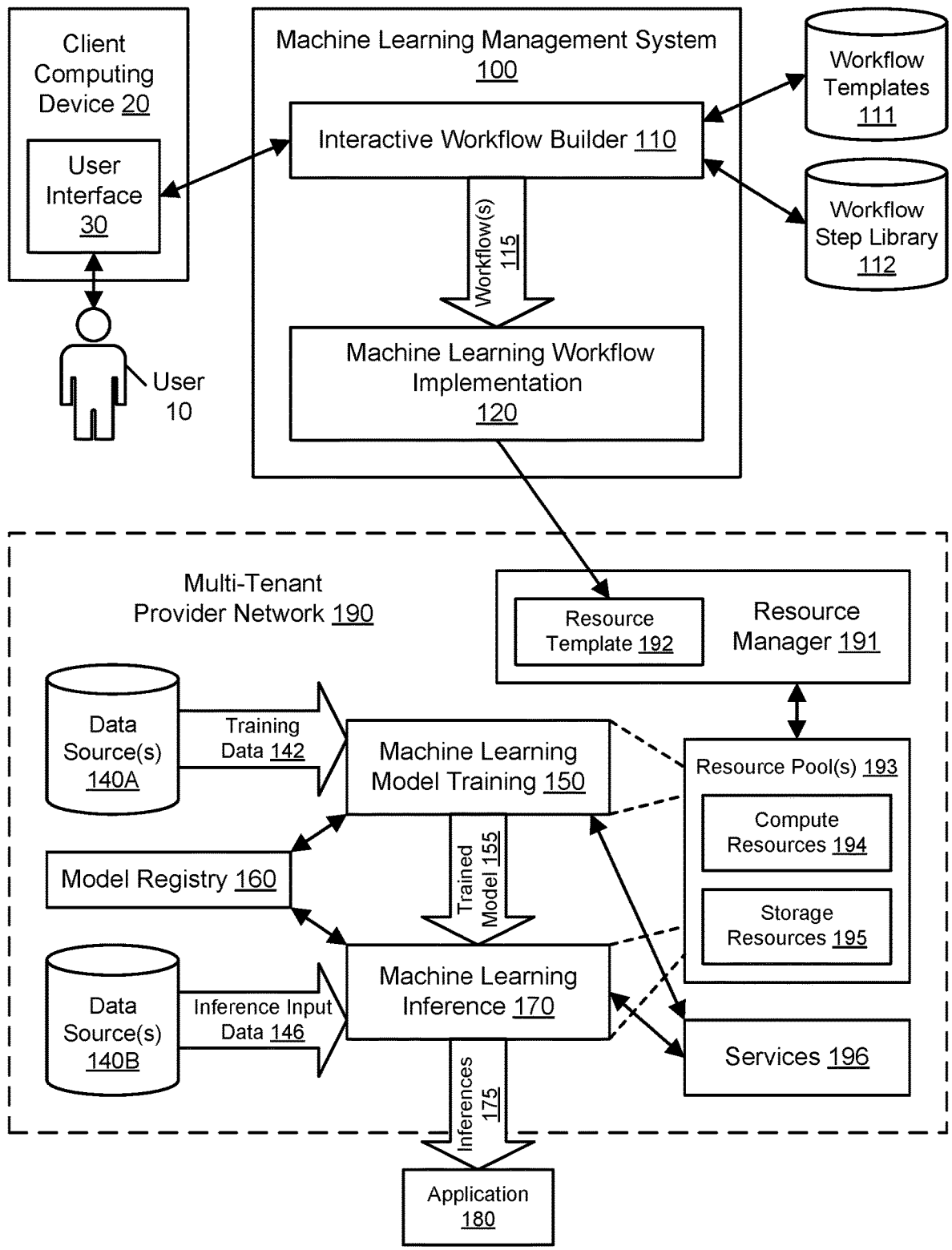
FIG. 1 illustrates an example system environment for interactive workflow generation for machine learning lifecycle management, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for interactive workflow generation for machine learning lifecycle management are described. Using prior approaches to machine learning, machine learning scientists often used an unmanaged, ad-hoc approach to machine learning tasks such as training and productionization. For example, machine learning scientists often wrote custom scripts to source and transform data features, ran model training jobs on their own dedicated compute infrastructure, manually moved model artifacts onto production hosts for every update, and otherwise used a disjoint set of tools for the lifecycle of a machine learning model. Such an inefficient approach often led to a loss of productivity as well as potential quality problems with machine learning models due to a lack of enforcement for tasks such as versioning and approval.

Using the techniques described herein, a machine learning management system may manage an end-to-end machine learning model development lifecycle (MDLC) for rapid design, training, and productionization of high-quality machine learning models. The machine learning management system may implement workflows or blueprints for various stages of a lifecycle of a machine learning model, such as data sourcing, quality monitoring, feature engineering, model training, back-testing, evaluation and promotion, deployment (e.g., to produce inferences), and performance monitoring. By building and implementing workflows for an end-to-end machine learning lifecycle, the machine learning management system may accelerate the delivery of machine learning solutions while also improving the quality of machine learning models with versioning, auditing, and approval mechanisms.

The machine learning management system may implement workflows using a set of workflow templates along with a step library that represents machine learning tasks. Workflows may be determined dynamically based (at least in part) on interactions between the machine learning management system and users (e.g., machine learning scientists, developers, and so on) via a user interface. The user interface may display or present a set of prompts or questions, and the user's answers to those questions may determine the presentation of additional prompts as well as the selection of one or more workflow templates and configuration of one or more workflows from the selected template(s). The machine learning management system may determine and/or provision computing resources for performing a particular workflow. In one embodiment, the machine learning management system may generate a resource template that describes resources and their architecture. The resource template may be merged into a continuous deployment pipeline so that the workflow can be performed using the provisioned resources in a multi-tenant provider network. Workflows may be implemented using orchestration of various services of the provider network. Models may be maintained in a model registry, and changes to workflows or steps in the step library may be automatically deployed to existing workflows.

As one skilled in the art will appreciate in light of this disclosure, embodiments may be capable of achieving certain technical advantages, including some or all of the following: (1) reducing the consumption of computing resources by accelerating processes for development, deployment, and use of machine learning models; (2) reducing the consumption of computing resources for development, deployment, and use of machine learning models by provisioning resources on demand and not requiring developers to maintain dedicated fleets of resources; (3) improving the quality of machine learning models by permitting concurrent testing of different versions of a model as sourced from a model registry; (4) improving the quality of machine learning models using versioning, auditing, and approval mechanisms; (5) improving the use of storage, network, and computational resources by re-use of workflow steps for different workflows and different users; and so on.

FIG. 1 illustrates an example system environment for interactive workflow generation for machine learning lifecycle management, according to some embodiments. A machine learning management system 100 may manage the use of machine learning models on behalf of clients using blueprints for machine learning processes. The machine learning management system 100 may include a component for generating workflows. A workflow may include a plurality of steps that represent machine learning tasks. For example, workflows or their steps may relate to data sourcing, quality monitoring, feature engineering, model training, back-testing, evaluation and promotion, deployment (e.g., to produce inferences), and performance monitoring. The machine learning management system 100 may implement workflows using a set of workflow templates 111 that represent high-level or common use cases for different stages of the lifecycle of a machine learning model, e.g., model training, batch inference, real-time inference, monitoring, and so on. For example, a training workflow template may stitch together a series of activity steps for tasks such as data collection, data quality monitoring, feature engineering, model training, model testing, and model approval. As another example, a production workflow template may include steps for data collection, data quality monitoring, feature engineering, model loading, batch inferencing, and inference results uploading. As yet another example, a monitoring workflow template may be similar to the production workflow template but may include only steps for data collection, monitoring rules, and notification alarms when the monitoring rules are breached. The machine learning management system 100 may implement workflows using a step library 112 that represents individual machine learning tasks. The step library 112 may include program code or other artifacts that can be packaged in order to perform the corresponding functions in a machine learning workflow.

The machine learning management system 100 may manage the use of a machine learning model at various stages of the model's lifecycle, such as a data sourcing stage that produces raw features of input data, a data quality monitoring stage that produces validated features of input data, a feature engineering stage that produces derived or aggregated features of input data, a model development stage that produces a learning algorithm for model training, a model training stage where the model is trained, a model testing stage where the model is evaluated, an inference stage where the model is deployed and applied to live data to produce inferences (predictions), a monitoring stage where the quality of inference output is analyzed, and so on. In various embodiments, for example, the machine learning management system 100 may produce workflows usable to perform machine learning model training tasks 150 and machine learning inference tasks 170. The machine learning model training 150 may utilize a learning algorithm and training data 142 from one or more data sources 140A and may produce a trained model 155. The machine learning inference system 170 may apply the trained model 155 to inference input data 146 from one or more data sources 140B and may produce inferences 175.

In some embodiments, a machine learning model may be associated with a collection of weights trained against a corpus of data such that the model has "learned" how to apply those weights to classify or interpret a new sample of data. For example, the inference system 170 may use a model 155 to determine the likelihood of particular users clicking on particular advertisements in a web browser or other internet-enabled interface. The input to such a model may represent unique user identifiers, user demographic information, ad click histories for individual users, and so on. The inferences produced by such a model 155 may represent probability values or labels. As another example, the inference system 170 may use a model 155 to determine whether to offer home loans to applicants. The input to such a model may represent unique user identifiers, user income data, user credit histories, and so on. The inferences produced by such a model 155 may represent scores indicative of the attractiveness of individual applicants for the loans.

Using an interactive workflow builder component 110, one or more workflows 115 may be determined dynamically based (at least in part) on interactions between the machine learning management system 100 and users (e.g., machine learning scientists, developers, and so on) via a user interface 30. As shown in FIG. 1, at least a portion of the user interface 30 may be implemented on a client computing device 20. The client device 20 may include sufficient input and output components to permit interaction between the machine learning management system 100 and a user 10 via the user interface. One or more users such as user 10 may be associated with a user account with a provider network 190. The user interface 30 may display or present a set of prompts or questions, and the user's answers to those questions may determine the presentation of additional prompts as well as the selection of one or more workflow templates and configuration of one or more workflows from the selected template(s). The prompts may represent solicitations of user input. For example, the system 100 may determine an initial prompt for presentation via the user interface 30. The initial prompt may ask the user 10 to select a high-level process for use of a machine learning model, e.g., model training, real-time inference, batch inference, monitoring, and so on. The initial prompt may list a set of such processes from which the user 10 can make a selection. Based on a response to this prompt from the user 10, the workflow builder 110 may select one of the workflow templates 111 corresponding to the high-level process indicated by the user input. In one embodiment, a user 10 may select multiple workflow templates to represent an end-to-end machine learning lifecycle, such as one workflow template for ad-hoc training, one workflow template for scheduled production batch inferencing, and another workflow template for model performance monitoring.

Blueprints for machine learning may be customized on the workflow activity step level and/or on the workflow sequence flow level. After the workflow template has been selected as described above, the workflow builder 110 may determine one or more additional prompts soliciting specific choices to be made in building the customized workflow. For example, the user interface 30 may solicit input representing a training input dataset, references for a data collection step, data quality rules for a quality monitoring step, a specific model training algorithm for a training step, model approval rules for an approval step, locations at which to store outputs of various steps, a specific version of a model to be used for inference, and so on. The selection of additional prompts and the order in which those prompts are presented may be determined based on the selected workflow template as well as user responses to earlier prompts. Based on input from users (e.g., machine learning scientists), the system 100 may customize blueprints by adding extra steps or removing existing steps from workflow templates. For example, a blueprint may be customized to add multiple approval steps, combine multiple models into a composite model, and so on.

In one embodiment, the user interface 30 may include a command-line interface (CLI) in which textual prompts are displayed to the user, and textual responses to those prompts are received from the user. In one embodiment, the user interface 30 may include a graphical user interface (GUI) in which GUI elements representing prompts are displayed to the user, and responses to those prompts (e.g., user interaction with GUI elements such as checkboxes and text entry panes) are received from the user. In one embodiment, the user interface 30 may include a voice-enabled interface in which audio prompts are displayed to the user, and voice responses to those prompts are received from the user. In some embodiments, the GUI and/or voice-enabled interface may be built on top of the CLI. In some embodiments, the system 100 may offer an application programming interface (API) or other programmatic interface that permits other components to invoke the functionality of the system to build and implement workflows.

Data sources 140A and 140B may include one or more database systems, data stores, tables, repositories, storage services, sources of streaming data, servers, memory locations, and so on. The various data sources 140A and 140B may be indicated in responses from one or more users via the user interface. For example, a user 10 may provide input indicating a particular storage service along with a particular location (or set of locations) from which data can be sourced from that storage service. The training data 142 may be gathered by users or automated systems and used as input to an initial machine learning model to prepare the model to produce predictions. The inference input data 146 may represent real-world data, may be gathered by users or automated systems, and may be used as input to the tested machine learning model 155 to produce predictions about real-world behavior.

Machine learning models may be maintained in a model registry 160. The model registry 160 may provide versioning of models. For example, a "beta" version of a model may be produced by a model training workflow and added to the model registry 160 with a first version identifier. A model testing workflow may retrieve the version of the model with the first version identifier from the model registry 160, produce a tested and production-ready model using that input, and add the production version to the model registry with a second version identifier. An inference workflow may retrieve the production version of the model with the second version identifier from the model registry 160 and produce inferences using that version. The use of versioning by the model registry 160 may permit the system 100 to enforce a greater degree of quality control on machine learning models and their usage. In some embodiments, the model registry 160 may enable side-by-side AB testing and progressive deployments of models.

The model registry 160 may be used to track the lineage of a model. In some embodiments, the model registry 160 may track and inputs and/or outputs expected for particular versions of models. The input-tracking and output-tracking may permit the orchestration of multiple models in a single use case.

The training 150 and inference 170 phases may be implemented in the same execution environment or in different execution environments. For example, in one embodiment, a unified machine learning framework may perform the training 150 and inference 170 in a hosted environment on behalf of clients. In some embodiments, training 150 tasks may be performed by clients to produce a model, and that model may be used to produce inferences in a hosted environment on behalf of a client. In some embodiments, the training 150 tasks may be performed in a hosted environment on behalf of a client, and the inference tasks 170 may be performed in an external environment (e.g., using client-hosted servers or using another machine learning framework). Any of the training 150 or inference 170 components may represent individual systems or subsystems that are loosely coupled or decoupled from one another. As shown in FIG. 1, the training 150 and inference 170 may be performed using resources of a multi-tenant provider network 190.

The inference system 170 may include a plurality of endpoints. Each of endpoints may host one or more machine learning models that are used to generate inferences. Each of the endpoints may include one or more hosts or servers that perform inference tasks. The inference production may apply a trained machine learning model 155 to inference input data 146 in order to generate inferences 175. In one embodiment, the inferences 175 may be produced in substantially real-time, e.g., with minimal delays after the gathering of the inference input data 146. In one embodiment, the inferences 175 may be produced in batches and not necessarily in real time. The inferences 175 may be used by an application 180 to make decisions. For example, if the inferences 175 represent probability values or labels for the likelihood of particular users clicking on particular advertisements in a web browser, then the application 180 may represent a web server that generates particular advertisements for particular users. As another example, if the inferences 175 represent scores indicative of the attractiveness of individual applicants for loans, then the application 180 may represent a loan system that generates loan offers or approves applications for loans. The loan system may be automated or may rely on user input to approve the recommendations generated by the inference system 170 as inferences 175. As yet another example, the application 180 may be associated with consumer payments to an online retailer, e.g., for predicting transaction risks. In some embodiments, the application 180 may include a client-side library that interacts with the model registry 160. Using the client-side library 160, the application 180 may obtain information from the model registry 160 such as the endpoint at which a model version is hosted (e.g., for real-time inference), the status of a model version, and so on.

Figure 7:
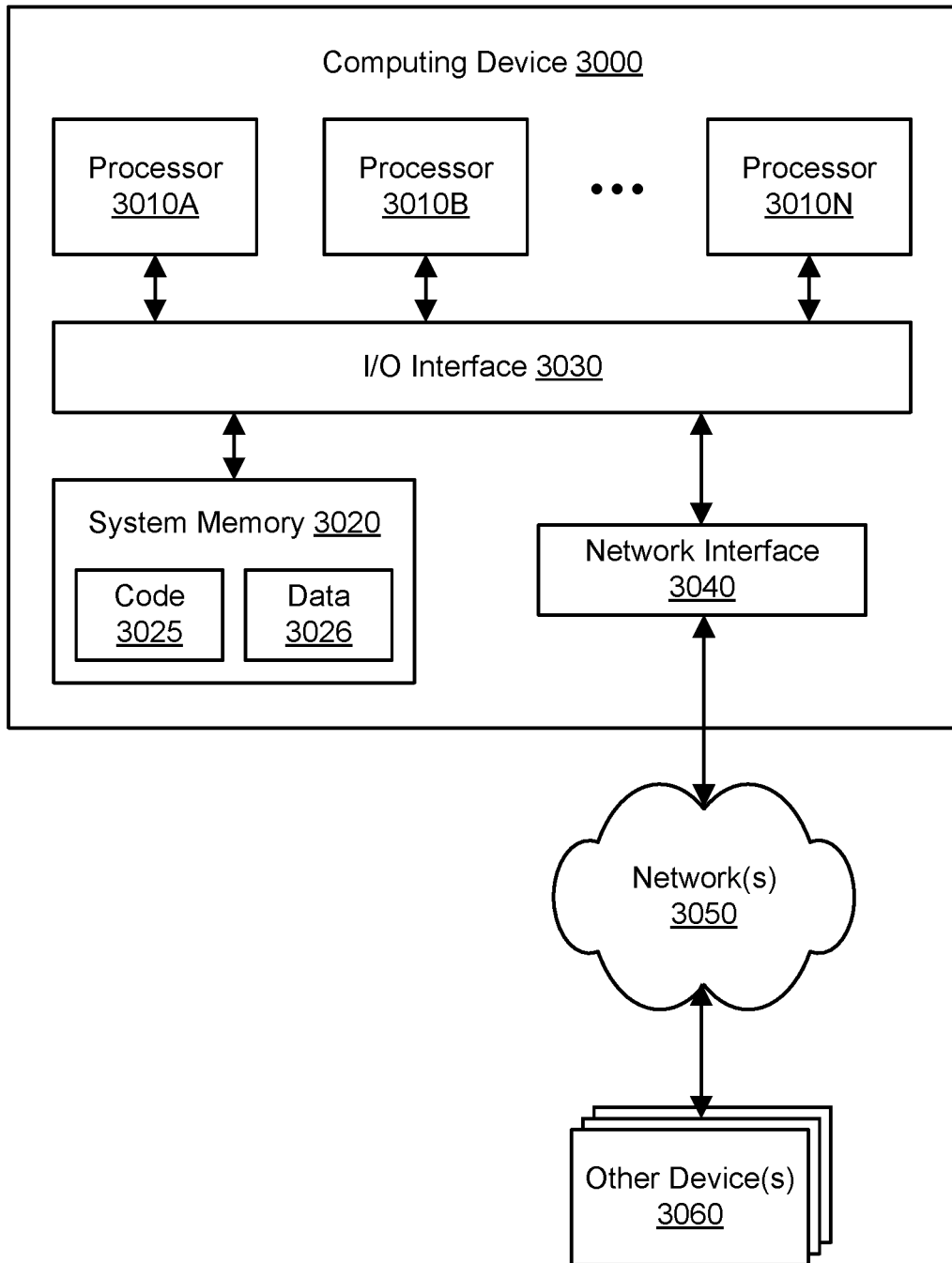
FIG. 7 illustrates an example computing device that may be used in some embodiments.

In some embodiments, a machine learning model may be encapsulated in a container for execution in a containerized environment. An execution environment may include or be associated with one or more systems, services, or other components that implement machine learning tasks. Any of the systems, services, or other components of an execution environment may be built on one or more computing devices such as the example computing device 3000 as illustrated in FIG. 7. The execution environments may vary in terms of their underlying configurations. In one embodiment, the execution environments may include MapReduce-based cluster computing environments, stream processing systems, workflow systems, and other suitable environments. In one embodiment, an execution environment may be implemented using a cluster of computing devices that cooperate to execute machine learning tasks. Using the machine learning management system 100, a cluster may be provisioned, launched, or otherwise spun up in order to perform one or more machine learning tasks described in one or more workflows 115. In one embodiment, a particular execution environment may use an orchestration framework such as Apache Hadoop, Apache Spark, and so on to manage a cluster.

Using a component for machine learning workflow implementation 120, the machine learning management system 100 may determine a set of computing resources usable for performing a particular workflow 115. In determining the resources, the system 100 may select or determine resource types, resource numbers, and resource configurations. The machine learning management system 100 may provision the resources from one or more resource pools 193 of a multi-tenant provider network 190. Provisioning a resource may include selecting the resource, reserving the resource for use by a particular account, configuring the resource to perform the desired task(s), and so on. The resource pools may include compute instances 194, storage resources 195, and other resources usable to perform machine learning tasks. To provision resources, the system 100 may interact with a resource manager 191 of the provider network 190 to select and reserve particular resources for use in performing workflows (or portions thereof) on behalf of particular users. The machine learning management system 100 may generate code packages to implement workflows 115, e.g., using code associated with steps in the step library 112.

In one embodiment, the machine learning management system 100 may generate a resource template 192 that describes resources and their architecture that are usable to perform a particular workflow. The resource template 192 may be provided to a cloud-based resource management service offered by the provider network 190, such as the resource manager 191. The resource template 192 may be merged into a continuous deployment pipeline associated with the user 10 so that the workflow can be performed using the provisioned resources in the multi-tenant provider network 190. Workflows 115 may be implemented using orchestration of various services 196 of the provider network 190. For example, services 196 in the provider network 190 that implement machine learning tasks may include virtualized compute services that offer virtual compute instances, virtualized storage services that offer virtual storage resources, virtualized graphics processing services that offer virtual graphics processing units (GPUs), serverless computation services that execute code on behalf of clients, batch computing services that run batch computing jobs, machine learning endpoints in a machine learning framework, and so on. Changes to workflows 115 and/or changes to underlying steps in the step library 112 may be automatically deployed to (or reflected in) existing workflows in the continuous deployment environment. In this manner, existing workflows or tasks may be kept up-to-date without necessarily requiring machine learning scientists to manually update their deployments.

As discussed herein, the machine learning management system 100 may largely automate the use of machine learning models after generating workflows 115 based on user interactions. In some embodiments, users may manually customize workflows 115. Customizing a workflow may include editing a plain file (e.g., in a format such as JSON) that describes a machine learning process as a series of activity steps with simple conditional statements, next state pointers, and input and output variable mappings between activity steps. To customize a workflow, a user may retrieve a workflow definition package from a repository and update a set of configuration files (e.g., JSON files) that define workflow parameters. For example, the workflow parameters may define parameters such as a provider network account that the user's team owns to run training and batch inferencing jobs within a cloud-based machine learning framework; the name of the training, testing, and production batch inferencing datasets from a feature repository; the unique identifier of the built-in machine learning algorithm provided by the cloud-based machine learning framework or a custom algorithm built with a containerization system; a desired host instance type and count; data quality monitoring rules that halt the training if a particular feature is showing a significant drift from the previous snapshots; derived features from raw datasets such as the number of customer payment transactions in the last three months; screening rules of trained models based on testing metrics and predefined model confidence thresholds; one or more email addresses to receive training and testing results by the user or other approvers to approve a trained model for production; the workflow activity step sequence with extra steps in the workflows to support ensemble models so that the user can route the output of one model to the input of another; and so on.

In some embodiments, a user 10 may manually approve a workflow definition generated by the system 100. In some embodiments, workflow steps may solicit additional user input, e.g., for approval of models or additional steps. In one embodiment, a code change may trigger the building and deployment of the training, production, and monitoring workflows to the user's account with a cloud-based resource management service. After all the workflows finish deploying, the user 10 may open a Step Functions console, select the training workflow created by the pipeline, and initiate dozens of executions with different model tuning parameters. The user 10 may now wait for the system to send notifications (e.g., via email) about the result of each training workflow, its artifact location, and an approval link to promote it to production. With a single click on the approval link in the notification by the user 10, the approved model may be registered in the central model registry 160, and the approved model may be picked up by the production workflow to run inferencing. With the model now running in production, the user 10 may rely on the monitoring workflow to collect performance metrics, evaluate them against predefined thresholds, and receive alarms if the model performance deteriorates. Using these techniques, a particular user 10 or team may concurrently manage multiple machine learning models at various stages of their respective lifecycles instead of productionizing one model before being able to productionize another model.

The machine learning management system 100 and client device 20 may be implemented using any suitable number and configuration of computing devices, any of which may be implemented by the example computing device 3000 illustrated in FIG. 7. The computing devices may be located in any suitable number of data centers or geographical locations. In various embodiments, at least some of the functionality of the system 100 may be provided by the same computing device or by different computing devices. If any of the components of the system 100 are implemented using different computing devices, then the components and their respective computing devices may be communicatively coupled, e.g., via one or more networks. Each of the components of the system 100 and the provider network 190 may represent any combination of software and hardware usable to perform their respective functions, as discussed as follows. Operations implemented by the system 100 and the provider network 190 may be performed automatically, e.g., without a need for user initiation or user intervention after an initial configuration stage, and programmatically, e.g., by execution of program instructions on at least one computing device. It is contemplated that the system 100 and the provider network 190 may include additional components not shown, fewer components than shown, or different combinations, configurations, or quantities of the components shown.

One or more components of the system 100 and/or one or more components that perform workflow steps may be implemented in a service-oriented system in which multiple services 196 (e.g., services in one or more hosted execution environments) collaborate according to a service-oriented architecture. In such an environment, the system 100 may offer its functionality as a service to multiple clients. To enable clients to invoke its functionality, the system 100 may expose any suitable interface(s), such as one or more APIs or other programmatic interfaces and/or graphical user interfaces (GUIs). A service may be implemented using a plurality of different instances that are distributed throughout one or more networks, and each instance may offer access to the functionality of the corresponding service to various clients. In one embodiment, the functionality of the system 100 and/or a workflow step may be offered to clients in exchange for fees, or the cost associated with performing a machine learning task may be assessed to a responsible entity.

Components of the system 100 and the provider network 190 may convey network-based service requests to one another via one or more networks. In various embodiments, the network(s) may encompass any suitable combination of networking hardware and protocols necessary to establish network-based communications between components. For example, the network(s) may generally encompass the various telecommunications networks and service providers that collectively implement the Internet. The network(s) may also include private networks such as local area networks (LANs) or wide area networks (WANs) as well as public or private wireless networks. For example, two different components may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the given component and the Internet as well as between the Internet and another component. It is noted that in some embodiments, components may communicate using a private network rather than the public Internet.

In one embodiment, components of the system 100 and/or components used to perform workflow steps may be implemented using computing resources of a provider network 190. The provider network 190 may represent a network set up by an entity such as a company or a public-sector organization to provide one or more services (such as various types of network-accessible computing or storage) accessible via the Internet and/or other networks to a distributed set of clients. The provider network 190 may include numerous data centers hosting various resource pools 193, such as collections of physical and/or virtualized computer servers, storage devices, networking equipment and the like, that are used to implement and distribute the infrastructure and services offered by the provider. The compute resources 194 may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. Because resources of the provider network 190 may be under the control of multiple clients (or tenants) simultaneously, the provider network may be said to offer multi-tenancy and may be termed a multi-tenant provider network. Aspects of the provider network 190 may be hosted in the cloud, and the network may be termed a cloud-based provider network.

Figure 2:
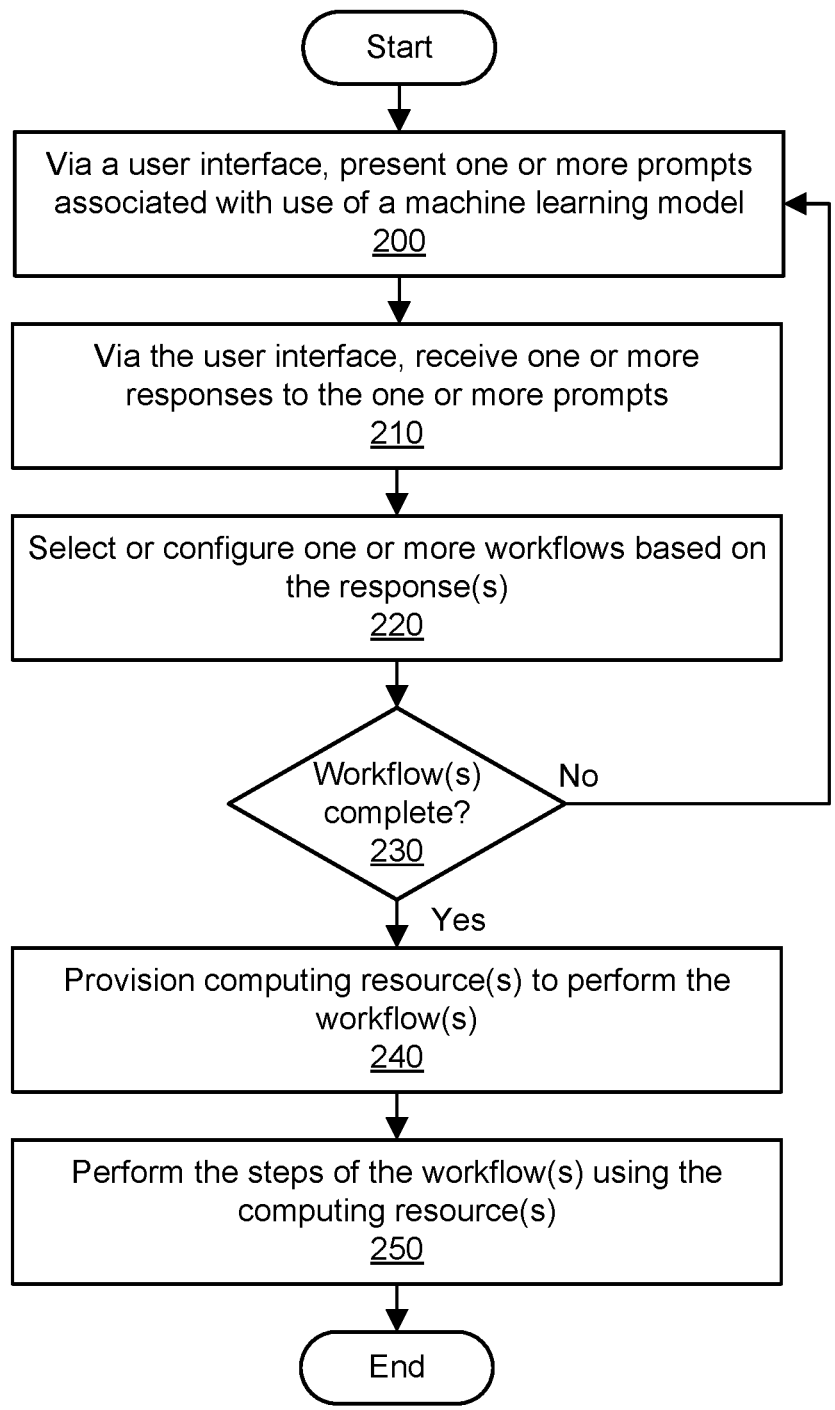
FIG. 2 is a flowchart illustrating a method for interactive workflow generation for machine learning lifecycle management, according to some embodiments.

FIG. 2 is a flowchart illustrating a method for interactive workflow generation for machine learning lifecycle management, according to some embodiments. As shown in 200, one or more prompts may be presented to a user via a user interface. The prompt(s) may be determined by an interactive workflow builder of a machine learning management system and sent over a network to a computing device operated by the user. The prompt(s) may represent questions associated with the use of a machine learning model. The prompt(s) may solicit the selection of a machine learning process such as model training, batch inference, or real-time inference, e.g., by presenting a list of such processes. As shown in 210, one or more responses to the prompt(s) may be received via the user interface. The response(s) may be entered by a user into a computing device via appropriate input and sent over a network to the interactive workflow builder. The response(s) may represent answers to the questions associated with the use of a machine learning model. The response(s) may include a selection of a machine learning process such as model training, batch inference, or real-time inference. In one embodiment, a user may select multiple workflow templates to represent an end-to-end machine learning lifecycle, such as one workflow template for ad-hoc training, one workflow template for scheduled production batch inferencing, and another workflow template for model performance monitoring.

As shown in 220, the interactive workflow builder may determine, select, or otherwise configure one or more workflows based (at least in part) on the response(s). For example, to begin building a workflow for model training, the interactive workflow builder may select a model training workflow template from a library of workflow templates. A workflow may include a set of steps or other ordered elements representing tasks to be performed in association with a machine learning model. For example, workflows or their steps may relate to data sourcing, quality monitoring, feature engineering, model training, back-testing, evaluation and promotion, deployment (e.g., to produce inferences), and performance monitoring. The interactive workflow builder may determine a customized workflow for the user based (at least in part) on the user's responses to the prompts and based (at least in part) on a selected workflow template. The one or more workflows may define workflow steps at a plurality of stages of the lifecycle of the machine learning model, such as data sourcing, data quality monitoring, feature engineering, model development, model training and evaluation, model deployment and inference, model monitoring, and so on.

As shown in 230, the interactive workflow builder may determine whether the workflow(s) are complete. A workflow may be deemed complete when the interactive workflow builder has no additional questions to ask the user concerning the workflow being generated. If one or more of the workflows are not complete, the method may continue with the operations shown in 200, 210, and 220. The interactive workflow builder may determine additional prompt(s) to solicit configuration information for customizing a workflow template for the specific needs of the user. For example, the user interface may solicit input representing a training input dataset, references for a data collection step, data quality rules for a quality monitoring step, a specific model training algorithm for a training step, model approval rules for an approval step, locations at which to store outputs of various steps, a specific version of a model to be used for inference, and so on As shown in 240, the method may determine and/or provision one or more computing resources to perform the generated workflow(s). In determining the resources, the machine learning management system may select or determine resource types, resource numbers, and resource configurations. The machine learning management system may provision the resources from one or more resource pools of a multi-tenant provider network. Provisioning a resource may include selecting the resource, reserving the resource for use by a particular account, configuring the resource to perform the desired task(s), and so on. The resource pools may include compute instances, storage resources, and other resources usable to perform machine learning tasks. To provision resources, the machine learning management system may interact with a resource manager of the provider network to select and reserve particular resources for use in performing workflows (or portions thereof) on behalf of particular users.

As shown in 250, the steps of the workflow(s) may be performed using the selected computing resource(s). In one embodiment, the machine learning management system may generate a resource template that describes resources and their architecture for a particular workflow. The resource template may be provided to a cloud-based resource management service offered by the provider network. The resource template may be merged into a continuous deployment pipeline so that the workflow can be performed using the provisioned resources in the multi-tenant provider network. Workflows may be implemented using orchestration of various services of the provider network. For example, services in the provider network that implement machine learning tasks may include virtualized compute services that offer virtual compute instances, virtualized storage services that offer virtual storage resources, virtualized graphics processing services that offer virtual graphics processing units (GPUs), serverless computation services that execute code on behalf of clients, batch computing services that run batch computing jobs, machine learning endpoints in a machine learning framework, and so on.

Figure 3:
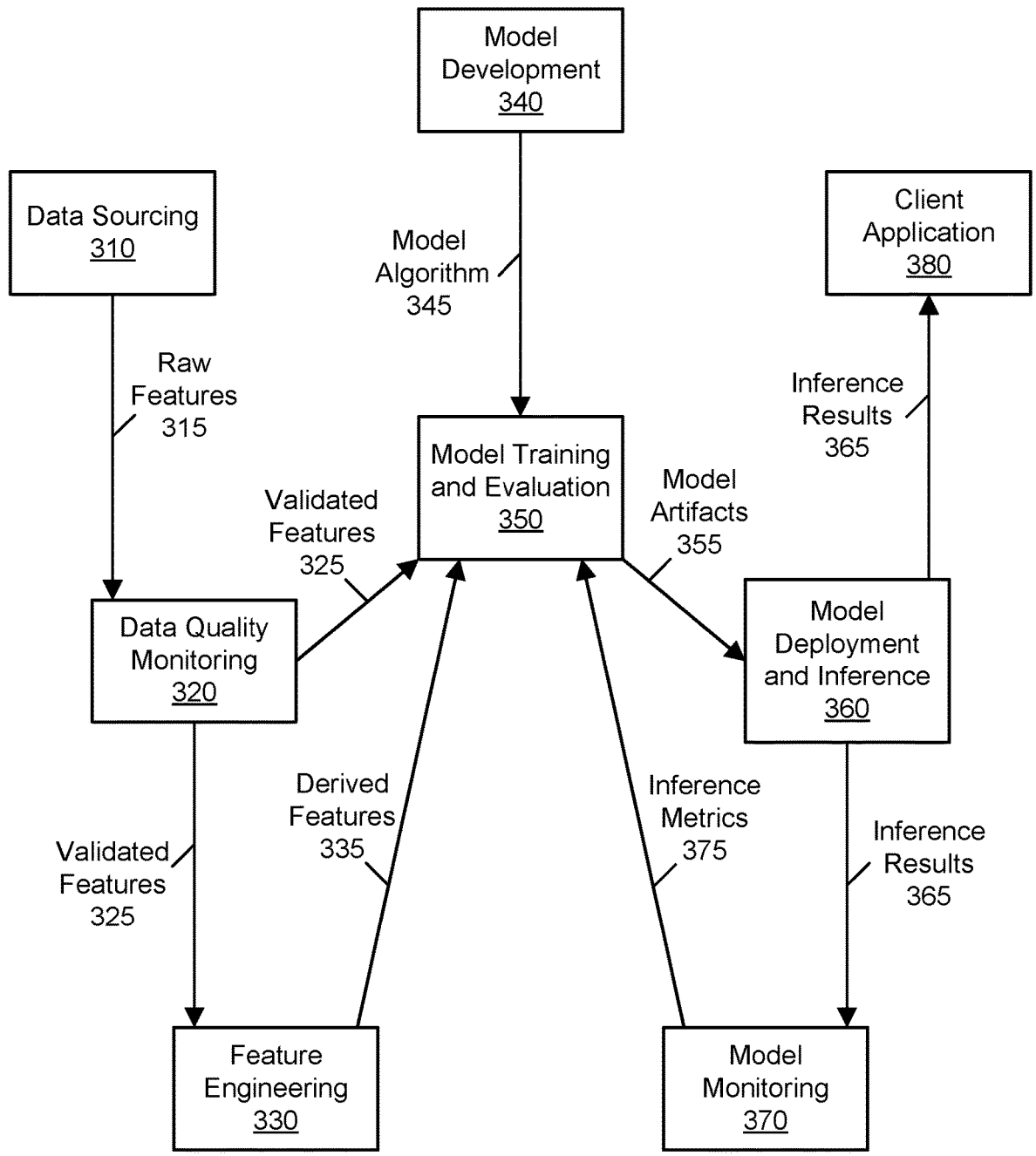
FIG. 3 illustrates an example of machine learning processes that can be implemented using the interactive workflow generation for machine learning lifecycle management, according to some embodiments.

FIG. 3 illustrates an example of machine learning processes that can be implemented using the interactive workflow generation for machine learning lifecycle management, according to some embodiments. To develop and productionize machine learning models, workflows or their steps may relate to tasks or processes at various stages of model lifecycles. The lifecycle of a machine learning model may include stages such as data sourcing 310, data quality monitoring 320, feature engineering 330, model development 340, model training and evaluation 350, model deployment and inference 360, and model monitoring 370. Data sourcing 310 may include discovering and sourcing data features for model development, training, evaluation, and inferencing. One or more data sourcing tasks 310 may provide a set of raw features 315 to one or more data quality monitoring tasks 320. Data quality monitoring 320 may include monitoring the quality of data features that can affect the outcome of model training and the performance of model inferencing. The one or more data quality monitoring tasks 320 may provide a set of validated features 325 to one or more feature engineering tasks 330 and also to one or more model training and evaluation 350 tasks. Feature engineering 330 may include converting raw data features to aggregated data features to help model development. The one or more feature engineering tasks 330 may provide one or more derived features to the one or more model training and evaluation tasks 350.

Model development 340 may include writing model algorithms (learning algorithms) to test new ideas by using a notebook or coding in an appropriate language. In one embodiment, a machine learning framework may provide dozens of model algorithms, e.g., linear regression, random forest, XGBoost, and so on. One or more model development tasks 340 may provide a model algorithm 345 to the one or more model training and evaluation 350 tasks. Model development 340 may include using an existing model algorithm provided by the framework and tweaking its parameters, writing a new custom algorithm, or migrating an existing custom algorithm. Model training and evaluation 350 may include training models by launching multiple training jobs with different algorithms, tuning parameters, and evaluating the best performing model for promotion. The one or more model training and evaluation 350 tasks may provide one or more model artifacts 355 to the one or more model deployment and inference tasks 360.

Model deployment and inference 360 may include deploying models from the training environment to the production environment with incremental deployment and rollback support. Model deployment and inference 360 may support include A/B testing of different models and shadow mode testing. In various embodiments, the inferencing may run in an offline batch mode, a real-time mode, or a hybrid of both. The one or more model deployment and inference tasks 360 may generate inference results 365 that are usable by one or more model monitoring tasks 370 and also by a client application 380 (e.g., corresponding to the application 180).

Model monitoring 370 may include monitoring a model in production by observing its input data metrics, inferencing output metrics, and how the metrics compare to actual labels. Model monitoring 370 may include detecting model inferencing output data anomalies with respect to historical datasets. Model monitoring 370 may include tracking of model inferencing accuracy, e.g., using ground truth values. When a model starts to degrade as determined using the model monitoring 370, it may be either retrained or replaced by another model automatically or through a manual approval process. The one or more model monitoring tasks 370 may provide inference metrics 375 to the one or more model training and evaluation 350 tasks.

As discussed above, steps in workflows may be sourced from a step library 112. The workflow steps may be centrally located and curated via the step library 112. If a step is changed in the library 112, then existing workflows that are dependent on that step may be changed automatically, e.g., when the step is performed using the updated code. Examples of such steps are discussed as follows.

In one embodiment, an Initialize Workflow step in the step library 112 may initialize a workflow execution instance by assigning a unique ID and storage bucket to track all model workflow related artifacts, including workflow inputs parameters, algorithm version, input datasets, training parameters, training model artifacts, test datasets, test output, and batch inferencing output. These artifacts may be stored in the workflow execution-specific bucket for diagnostic, versioning, and auditing purposes. In one embodiment, a Finalize Workflow step in the step library 112 may represent a final activity to clean up temporary resources before exiting the workflow.

In one embodiment, a Load Data step in the step library 112 may handle downloading datasets from a particular storage source and uploading them to a bucket in CSV format to run model training or batch inferencing in a machine learning framework. The input of this step may include a source dataset ID and a destination bucket path. The output may include a list of the actual file paths uploaded to the destination bucket. This step may be used in multiple workflows. For example, it can be used in the model training workflow to ingest training data, the model batch inferencing workflow to read input data, the model real-time inferencing workflow to cache online features, and the model monitoring workflow to load ground truth data.

In one embodiment, a Check Data File Quality step in the step library 112 may check the data quality of a dataset after onboarding it. The input of this step may include a data file ID, and the output may include a flag indicating whether the dataset has passed the data quality check rules previous defined on the self-service UI. This step may be used to error out the model training workflow to avoid training on inconsistent training data or the model inferencing workflow to avoid returning inconsistent inferencing data.

In one embodiment, a Select Feature List step in the step library 112 may run a standard Feature Selection library to reduce the number of input data features for model training and inferencing. Such a step may typically be useful when there are hundreds of input data features while only a dozen of them have an impact on the model inferencing accuracy. The step may take training data as the input, and produce a list of selected features as the output. The output feature list may then be used in another Run Feature Selection step to reduce the size of training data or input data.

In one embodiment, a Train Model step in the step library 112 may directly link to the a built-in CreateTrainingJob API with a machine learning framework. The step may take a model name, a container environment image path, and a training data path as inputs, and the step may generate trained model artifacts in the specified output bucket. The step may be wired with other steps such as Load Data, Check Data File Quality, and Select Feature List so that it only trains on data that has been checked for data quality and optimized for impactful features. In one embodiment, a Test Model step in the step library 112 may call the machine learning framework to create and run a batch transform job on test dataset and wait until it is done.

In one embodiment, a Register Model for Production Inferencing step in the step library 112 may integrate with the model registry 160 and update the model alias to the specific trained model after it is approved. The step may take a bucket path containing trained model artifacts and a model alias as input, and the step may update the alias in the model registry 160 to point to the newly trained model artifacts. The step may act as a bridge between model training workflows and model inferencing workflows so that model inferencing workflows will always use the latest models that are approved and registered by the model training workflows.

In one embodiment, Create/Check/Rollback/Commit Deployment steps in the step library 112 may integrate with the model registry and endpoint APIs to orchestrate real-time model deployments. The steps may leverage a machine learning framework's support of hosting multiple models on the same endpoint with different traffic distribution weights. This may allow model deployment workflows to have dial-up and rollback steps that are typically seen in software deployments, such that the possibility of model downtime during deployment windows is reduced.

Figure 4:
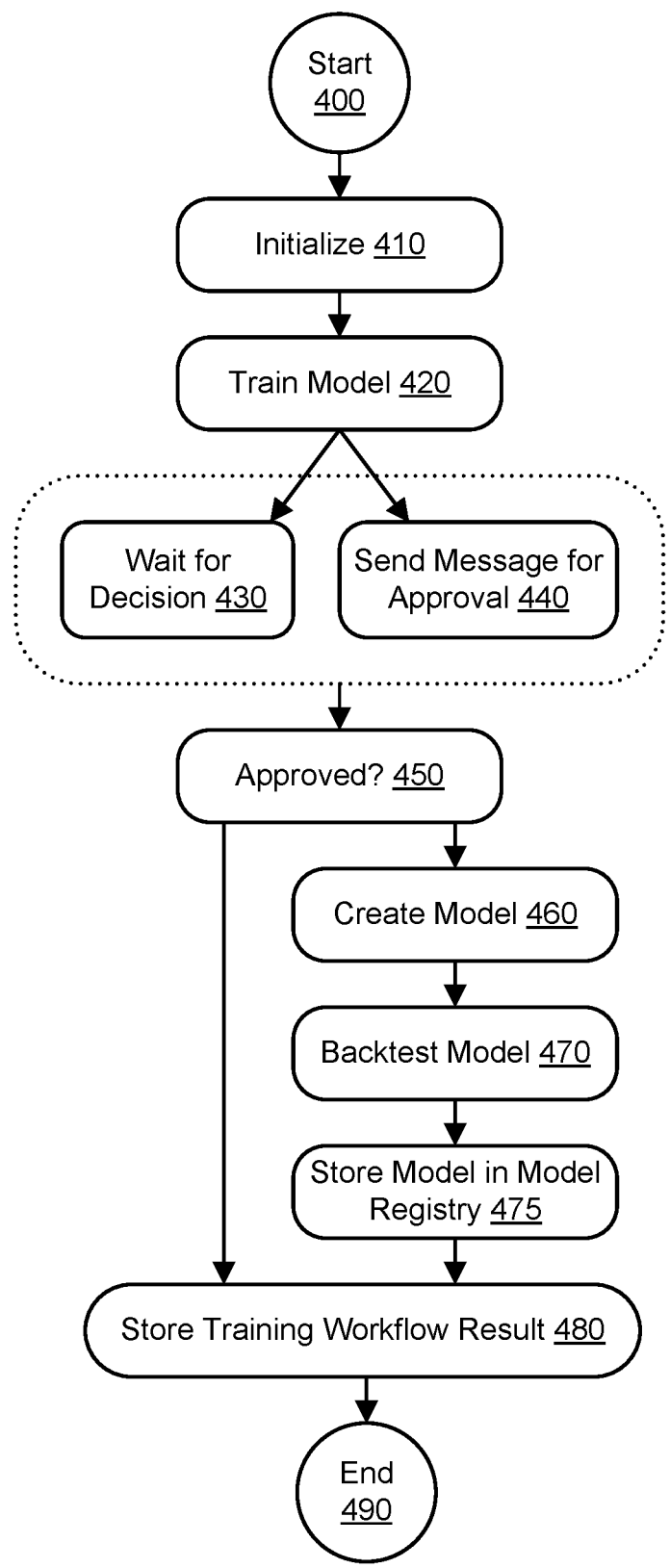
FIG. 4 illustrates an example of a model training workflow that can be produced using the interactive workflow generation for machine learning lifecycle management, according to some embodiments.

FIG. 4 illustrates an example of a model training workflow that can be produced using the interactive workflow generation for machine learning lifecycle management, according to some embodiments. The example training workflow may be determined by the interactive workflow builder 110 based (at least in part) on a training workflow template and user input received via a user interface. The various steps shown in the example workflow of FIG. 4 may be sourced from a step library 112 that may be centrally maintained and curated by team associated with the system 100. After the training workflow is started 400, the workflow may perform initialization 410. The training workflow may then perform model training 420. After the model training is performed, the training workflow may send a message for approval 440 of the model training, e.g., to a machine learning scientist associated with the workflow. The training workflow may wait for a decision 430 to approve or disapprove the model training. If the model training is approved 450, the training workflow may create the model 460 and then backtest the model 470 using a batch transform job. After testing, the training workflow may store the model in the model registry 475. The training workflow may store a training workflow result 480 before ending 490.

Figure 5:
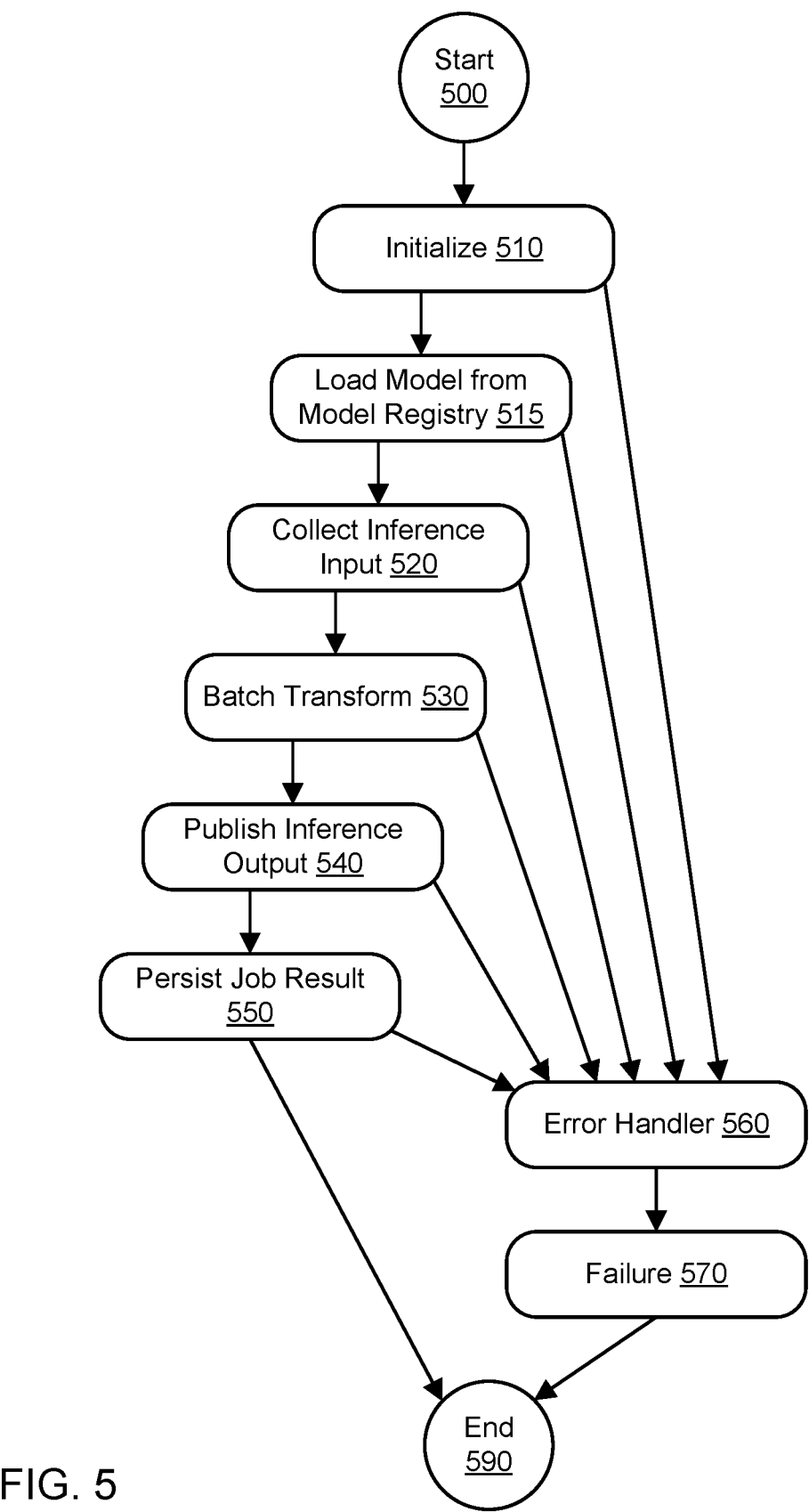
FIG. 5 illustrates an example of a batch inference workflow that can be produced using the interactive workflow generation for machine learning lifecycle management, according to some embodiments.

FIG. 5 illustrates an example of a batch inference workflow that can be produced using the interactive workflow generation for machine learning lifecycle management, according to some embodiments. The example batch inference workflow may be determined by the interactive workflow builder 110 based (at least in part) on a batch inference workflow template and user input received via a user interface. The various steps shown in the example workflow of FIG. 5 may be sourced from a step library 112. After the batch inference workflow is started 500, the workflow may perform initialization 510. After initialization, the batch inference workflow may retrieve the desired version of the model (e.g., the latest version or a version marked as production-ready) from the model registry 515. The batch inference workflow may collect inference input 520. The batch inference workflow may then perform a batch transform 530 on the inference input. The batch inference workflow may publish the inference output 540 of a selected machine learning model, e.g., to a designated storage location or other recipient. The batch inference workflow may persist the job result 550. If an error is encountered in any of the operations shown in 510, 515, 520, 530, 540, or 550, an error handler 560 may be invoked, and failure 570 may be returned before the workflow ends 590.

Figure 6:
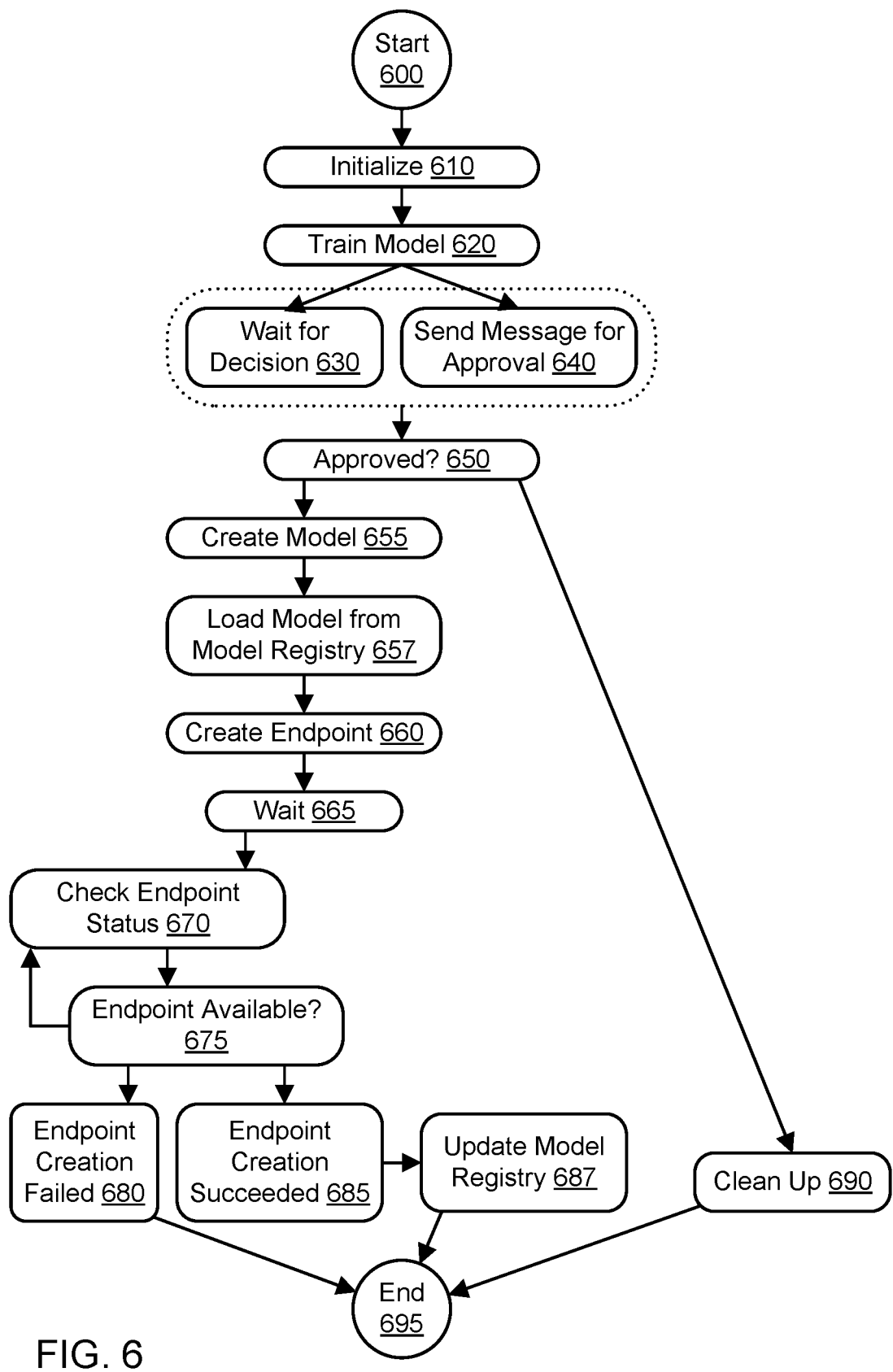
FIG. 6 illustrates an example of a real-time inference workflow that can be produced using the interactive workflow generation for machine learning lifecycle management, according to some embodiments.

FIG. 6 illustrates an example of a real-time inference workflow that can be produced using the interactive workflow generation for machine learning lifecycle management, according to some embodiments. The example real-time inference workflow may be determined by the interactive workflow builder 110 based (at least in part) on a real-time inference workflow template and user input received via a user interface. The various steps shown in the example workflow of FIG. 6 may be sourced from a step library 112. After the real-time inference workflow is started 600, the workflow may perform initialization 610. The real-time inference workflow may then perform model training 620. After the model training is performed, the real-time inference workflow may send a message for approval 640 of the model training, e.g., to a machine learning scientist associated with the workflow. The real-time inference workflow may wait for a decision 630 to approve or disapprove the model training. If the model training is not approved, the real-time inference workflow may perform a cleanup task 690 before ending 695. If the model training is approved 650, the real-time inference workflow may create the model 655, load the model from the model registry 657, and then create an endpoint 660 for deployment of the model, e.g., by requesting endpoint creation with a machine learning framework that provides endpoints for real-time inferencing. The real-time inference workflow may wait 665 (e.g., for a predetermined period of time) and then check the endpoint status 670, potentially more than once until the status is determined. If the endpoint is available 675, the real-time inference workflow may determine that endpoint creation and deployment of the model succeeded 685. The workflow may then update the model registry 687 with a new status of the particular version of the model that was deployed to the endpoint (e.g., so a client application can determine the status of the model version and/or endpoint) before ending 694. If the endpoint is not available, the real-time inference workflow may determine that endpoint creation and deployment of the model failed 680 before ending 695.

Illustrative Computer System

In at least some embodiments, a computer system that implements a portion or all of one or more of the technologies described herein may include a computer system that includes or is configured to access one or more computer-readable media. FIG. 7 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 7 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
    one or more pools of computing resources in a multi-tenant provider network; and
    one or more computing devices, comprising one or more processors and associated memory, configured to implement a machine learning management system, wherein the machine learning management system is configured to:
        determine one or more questions associated with use of a machine learning model, wherein the one or more questions are determined based at least in part on one or more workflow templates, and wherein the one or more questions are displayed via a user interface;
        receive input representing one or more answers to the one or more questions, wherein the one or more answers are provided via the user interface;
        determine one or more workflows associated with a plurality of stages of a lifecycle of the machine learning model, wherein the one or more workflows are determined based at least in part on the one or more answers, and wherein the one or more workflows comprise one or more tasks associated with training the machine learning model and one or more tasks associated with using the machine learning model to generate inferences;
        provision a set of computing resources from the one or more pools of computing resources; and
        cause the set of computing resources to perform at least a portion of the one or more tasks associated with training the machine learning model and at least a portion of the one or more tasks associated with using the machine learning model to generate inferences.

2. The system as recited in claim 1, wherein the one or more answers represent a selection of a particular workflow template, data indicative of one or more inputs for training the machine learning model, and data indicative of one or more inputs for using the machine learning model to generate the inferences.

3. The system as recited in claim 1, wherein the machine learning management system is further configured to:
    add a plurality of versions of the machine learning model to a model registry, wherein the plurality of versions of the machine learning model represent output of a plurality of steps of the one or more workflows; and
    based at least in part on the one or more workflows, retrieve a particular version of the plurality of versions of the machine learning model from the model registry, wherein the particular version is used by the one or more tasks associated with using the machine learning model to generate the inferences.

4. The system as recited in claim 1, wherein the machine learning management system is further configured to:
    determine a resource template describing the set of computing resources and representing one or more resource architectures in the multi-tenant provider network; and
    merge the resource template into a continuous deployment pipeline in the multi-tenant provider network.

5. A computer-implemented method, comprising:
- determining, by a machine learning management system, one or more prompts associated with use of a machine learning model;
- receiving input representing one or more responses to the one or more prompts, wherein the one or more responses are provided via a user interface;
- determining, by the machine learning management system, one or more workflows associated with the machine learning model, wherein the one or more workflows are determined based at least in part on the one or more responses, and wherein the one or more workflows comprise one or more tasks associated with training the machine learning model, or a plurality of tasks associated with the use of the machine learning model at a plurality of stages of a lifecycle of the machine learning model;
- provisioning one or more computing resources; and
- causing the one or more computing resources to perform at least a portion of the one or more workflows.

6. The method as recited in claim 5, wherein provisioning the one or more computing resources further comprises:
- provisioning the one or more computing resources from one or more pools of computing resources of a multi-tenant provider network; and
- wherein causing the one or more computing resources to perform at least the portion of the one or more workflows further comprises:
  - causing the one or more computing resources to perform at least a portion of the one or more tasks associated with training the machine learning model.

7. The method as recited in claim 5, wherein provisioning the one or more computing resources further comprises:
- provisioning the one or more computing resources from one or more pools of computing resources of a multi-tenant provider network; and
- wherein causing the one or more computing resources to perform at least the portion of the one or more workflows further comprises:
  - causing the one or more computing resources to perform at least a portion of the plurality of tasks associated with the use of the machine learning model at the plurality of stages of the lifecycle of the machine learning model.

8. The method as recited in claim 5, wherein determining the one or more computing resources comprises determining a resource template representing one or more resource architectures in a multi-tenant provider network, and wherein the method further comprises:
- merging the resource template into a continuous deployment pipeline.

9. The method as recited in claim 5, wherein the one or more workflows comprise one or more tasks associated with developing a learning algorithm associated with the machine learning model.

10. The method as recited in claim 5, wherein the one or more workflows comprise one or more tasks associated with determining inputs for use of the machine learning model.

11. The method as recited in claim 5, wherein the user interface comprises a command-line interface, a graphical user interface, or a voice-enabled interface.

12. The method as recited in claim 5, further comprising:
- receiving additional input representing one or more modifications to the one or more workflows, wherein the one or more modifications are provided via the user interface after the one or more workflows are initiated using the one or more computing resources; and
- determining, by the machine learning management system, a modified version of the one or more workflows associated with the machine learning model, wherein the modified version of the one or more workflows is determined based at least in part on the one or more modifications, wherein the modified version of the one or more workflows comprises one or more additional workflow steps or one or more modified workflow steps, and wherein at least a portion of the modified version of the one or more workflows is performed using the one or more computing resources.

13. The method as recited in claim 5, wherein at least a portion of the one or more workflows is performed using orchestration of a plurality of services of a multi-tenant provider network.

14. The method as recited in claim 5, further comprising:
- adding one or more versions of the machine learning model to a model registry, wherein the model registry maintains a lineage associated with the machine learning model; and
- based at least in part on the one or more workflows, retrieving a particular version of the one or more versions of the machine learning model from the model registry and using the particular version in one or more of the tasks of the one or more workflows.

15. One or more non-transitory computer-readable storage media storing program instructions that, when executed on or across one or more processors, perform:
- determining, by a machine learning management system, one or more questions associated with use of a machine learning model, wherein the one or more questions are determined based at least in part on one or more workflow templates;
- receiving input representing one or more answers to the one or more questions, wherein the one or more answers are provided via a user interface;
- determining, by the machine learning management system, a workflow associated with the machine learning model, wherein the workflow is determined based at least in part on the one or more answers, wherein the workflow comprises a plurality of tasks associated with the use of the machine learning model at a plurality of stages of a lifecycle of the machine learning model, and wherein the workflow comprises one or more tasks associated with training the machine learning model or one or more tasks associated with using the machine learning model to generate inferences;
- provisioning one or more computing resources from a multi-tenant provider network; and
- causing the one or more computing recourses to implement at least a portion of the workflow.

16. The one or more non-transitory computer-readable storage media as recited in claim 15, further comprising additional program instructions that, when executed on or across the one or more processors, perform:
- determining a resource template representing one or more resource architectures in the multi-tenant provider network; and
- merging the resource template into a continuous deployment pipeline in the multi-tenant provider network.

17. The one or more non-transitory computer-readable storage media as recited in claim 15, wherein the workflow comprises one or more tasks associated with monitoring a quality of input to the machine learning model.

18. The one or more non-transitory computer-readable storage media as recited in claim 15, wherein the workflow comprises one or more tasks associated with monitoring a quality of inference outputs of the machine learning model.

19. The one or more non-transitory computer-readable storage media as recited in claim 15, wherein at least a portion of the workflow is performed using orchestration of a plurality of services of the multi-tenant provider network, wherein the plurality of services comprise a machine language framework that hosts one or more endpoints usable to perform real-time inferencing according to the workflow.

20. The one or more non-transitory computer-readable storage media as recited in claim 15, further comprising additional program instructions that, when executed on or across the one or more processors, perform:
- adding a plurality of versions of the machine learning model to a model registry;
- retrieving a first version of the machine learning model and a second version of the machine learning model from the model registry; and
- performing a comparison of the first version of the machine learning model and the second version of the machine learning model according to the workflow.

\* \* \* \* \*